United States Patent
Li et al.

(10) Patent No.: US 6,937,643 B2
(45) Date of Patent: Aug. 30, 2005

(54) ROM-BASED PN GENERATION FOR WIRELESS COMMUNICATION

(75) Inventors: Tao Li, San Diego, CA (US); Li Zhang, San Diego, CA (US)

(73) Assignee: Qualcomm Inc, San Diego, CA (US)

( * ) Notice: Subject to any disclaimer, the term of this patent is extended or adjusted under 35 U.S.C. 154(b) by 208 days.

(21) Appl. No.: 10/137,028

(22) Filed: Apr. 30, 2002

(65) Prior Publication Data

US 2003/0202565 A1 Oct. 30, 2003

(51) Int. Cl.$^7$ ............................................. H04B 1/69
(52) U.S. Cl. .................. 375/147; 375/145; 375/152; 375/130; 370/321; 370/342; 342/363; 342/357
(58) Field of Search .............................. 375/147, 150, 375/152, 145, 130, 140; 370/321, 342, 328; 342/363, 357; 380/31

(56) References Cited

U.S. PATENT DOCUMENTS

| | | | | |
|---|---|---|---|---|
| 4,653,069 A | * | 3/1987 | Roeder .......................... | 380/31 |
| 6,381,229 B1 | * | 4/2002 | Narvinger et al. ........... | 370/328 |
| 6,459,722 B2 | * | 10/2002 | Sriram et al. ................ | 375/130 |
| 6,470,000 B1 | * | 10/2002 | Burns et al. ................. | 370/342 |
| 6,625,199 B1 | * | 9/2003 | McDonough ................ | 375/140 |
| 6,650,687 B1 | * | 11/2003 | McDonough ................ | 375/140 |

FOREIGN PATENT DOCUMENTS

| | | | | |
|---|---|---|---|---|
| EP | 0301383 | 7/1988 | ............ | H03K/3/84 |
| WO | 8700370 | 1/1987 | ............ | H04J/13/00 |

OTHER PUBLICATIONS

Patent Abstracts of Japan, vol. 2000, No. 15, Apr. 6, 2001 & JP 2000 349681 A (NEC Corp), Dec. 15, 2000 abstract.

* cited by examiner

*Primary Examiner*—Shuwang Liu
*Assistant Examiner*—Eva Zheng
(74) *Attorney, Agent, or Firm*—Phil R Wadsworth; Charles D Brown; Timothy Loomis

(57) ABSTRACT

A device includes a request arbitration unit that (1) receives a number of requests for PN vectors from a number of processing units and (2) provides a control indicative of each request selected for processing. An address generator provides one or more addresses (which may be dependent on a particular PN sequence being requested and the offset of the PN sequence) for each selected request. One or more memory units store all "base" PN sequences (e.g., and X(i) sequence and a Y(i) sequence defined by W-CDMA) that may be used to generate all requestable PN vectors. The memory unit(s) provide one or more segments of one or more base PN sequences, based on the address(es). A buffering unit provides a set of one or more PN vectors derived from the one or more PN segments for each selected request.

33 Claims, 10 Drawing Sheets

ROM-BASED PN GENERATION FOR WIRELESS COMMUNICATION

BACKGROUND

1. Field

The present invention relates generally to data communication, and more specifically to techniques for generating pseudo-random number (PN) sequences or vectors based on ROM(s).

2. Background

Wireless communication systems are widely deployed to provide various types of communication such as voice, packet data, and so on, for a number of users. These systems may be based on code division multiple access (CDMA), time division multiple access (TDMA), frequency division multiple access (FDMA), or some other multiple access technique. CDMA systems may provide certain advantages over other types of system such as increased capacity. A CDMA system may be designed to implement one or more CDMA standards such as IS-95, IS-2000, IS-856, W-CDMA, and so on, all of which are well known in the art.

In a CDMA system, data to be transmitted over the air is spectrally spread over the entire system bandwidth to combat deleterious transmission effects such as fading and multipath. At a transmitter, the spectral spreading is performed by multiplying the data to be transmitted with a pseudo-random number (PN) sequence. The spread data is further processed to generate a modulated signal, which is then transmitted over the air.

Due to artifacts in the propagation environment (e.g., building, natural structures, and so on), the modulated signal transmitted from a given transmitter may reach a receiver via a number of signal paths. The received signal at the receiver may thus include a number of multipath components (or signal instances), each of which corresponds to the signal received via a respective propagation path. Since the receiver may receive signals from multiple transmitters, the received signal may thus include a number of multipath components for a number of transmitters.

To recover a given multipath component in the received signal, a complementary spectral despreading operation is performed at the receiver. The received signal is initially conditioned and digitized to provide samples, and the samples are then despread with a (complex-conjugated) PN sequence corresponding to the one used at the transmitter. To recover the multipath component, the PN sequence used at the receiver needs to be aligned in time with the time of the arrival of the multipath component. Thus, the phase (or offset) of the PN sequence used at the receiver to recover the multipath component is dependent on both the offset of the PN sequence used at the transmitter and the propagation delay of the multipath component.

For a CDMA system, a rake receiver is often used to concurrently process a number of multipath components in the received signal. The rake receiver typically includes one or more searcher elements (or simply "searchers") and a number of demodulation elements (often referred to as "fingers"). Each searcher may be operated to process the received signal to search for strong multipath components. Each finger may then be assigned to process a multipath component of sufficient strength to recover the transmitted data.

Each searcher despreads the samples with PN sequences at various offsets, with each PN offset corresponding to a hypothesis being evaluated. In particular, to search for strong multipath components, each searcher typically performs a number of correlations of the samples with PN sequences at various offsets. Each correlation results in a high value if the PN sequence used for despreading is time-aligned with that of a multipath component, and a low value otherwise.

Each finger similarly despreads the samples with a PN sequence at a particular offset. This PN offset, which is dependent in part on the arrival time of the multipath component, may be initially determined by the searcher and thereafter tracked by the finger.

Conventionally, a dedicated PN generator is provided for each finger and used to generate the PN sequence at the desired offset. Similarly, a dedicated PN vector generator is provided for each searcher and used to generate the necessary PN vectors. (A PN vector is a short (e.g., 8-chip) segment of a PN sequence.) This conventional design includes a number of individual PN generators for a number of fingers and searchers. The total circuitry for all such PN generators may comprise a relatively large portion of the integrated circuit for the rake receiver. For this design, the PN generator circuitry grows as the number of searchers and fingers in the receiver increases.

There is therefore a need in the art for techniques for generating PN sequences or vectors for the searchers and fingers of a rake receiver, and which may be implemented with reduced circuitry.

SUMMARY

ROM-based PN generation techniques are described herein which can provide PN vectors for various processing units (e.g., fingers and searchers of a rake receiver). In one specific embodiment, a device operable to provide PN vectors includes a request arbitration unit, an address generator, and a buffering unit. The request arbitration unit receives a number of requests for PN vectors from a number of processing units, selects requests for processing if the processing order is not already specified, and provides a control indicative of each request selected for processing. The address generator provides a set of one or more addresses for each selected request. The addresses may be dependent on (1) a particular PN sequence (e.g., a particular scrambling code number) being requested and (2) the offset (or phase) of that PN sequence, which may in turn be dependent on the time of arrival of the multipath component being processed.

One or more memory units (which may be implemented internal or external to the device) store all "base" PN sequences (e.g., an X(i) sequence and a Y(i) sequence defined by W-CDMA) that may be used to generate all requestable PN vectors. The memory unit(s) then provide one or more segments of one or more base PN sequences, based on the set of one or more addresses. The buffering unit provides a set of one or more PN vectors derived from the one or more PN segments for each selected request. This buffering unit may shift each PN segment by a particular number of bit positions determined by the scrambling code number associated with the selected request.

The received requests may be processed in a time multiplexed manner, one request at a time, based on a particular priority assignment scheme. In an embodiment, the device can provide a set of up to three PN vectors (e.g., for a main scrambling code, a first auxiliary scrambling code, and a second auxiliary scrambling code) for each finger request, and a single PN vector (e.g., for the main scrambling code)

for each searcher request. The device may also be designed to provide a primary synchronization code (PSC) vector for each finger request. Each PN vector may cover an 8-chip period.

Various aspects and embodiments of the invention are described in further detail below. The invention further provides integrated circuits, methods, program codes, digital signal processors, receiver units, transmitter units, terminals, base stations, systems, and other apparatuses and elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
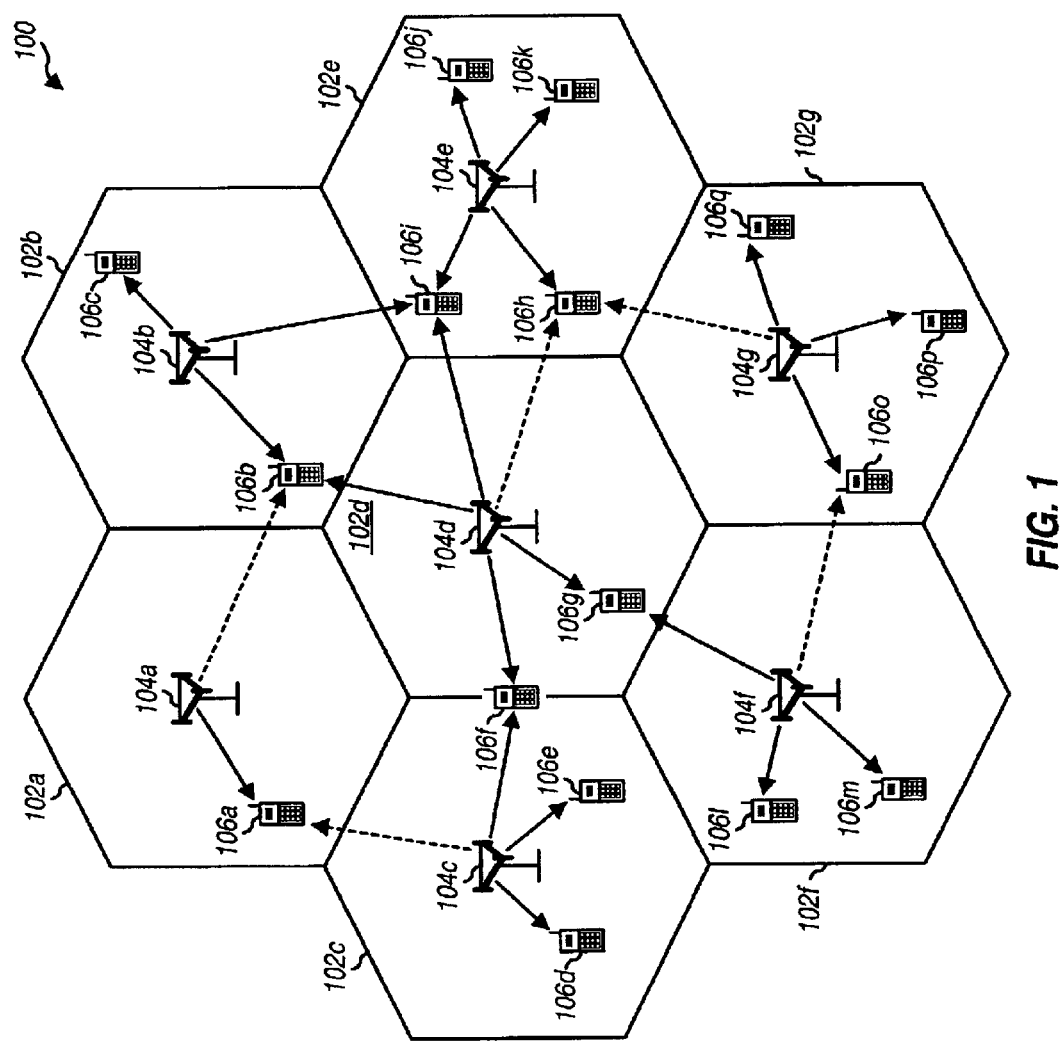
FIG. 1 is a diagram of a wireless communication system.

FIG. 1 is a diagram of a wireless communication system 100 that supports a number of users. System 100 includes a number of base stations 104 that provide coverage for a number of geographic regions 102. The base station is also referred to as a base transceiver system (BTS) or an access point, and the base station and/or its coverage area are also often referred to as a cell. System 100 may be designed to implement one or more CDMA standards such as W-CDMA, IS-95, IS-2000, IS-856, and so on, all of which are well known in the art and incorporated herein by reference.

As shown in FIG. 1, various terminals 106 are dispersed throughout the system. Each terminal 106 may communicate with one or more base stations 104 on the forward and reverse links at any given moment, depending on whether or not the terminal is active and whether or not it is in soft handoff. The forward link (i.e., downlink) refers to transmission from the base station to the terminal, and the reverse link (i.e., uplink) refers to transmission from the terminal to the base station.

In the example shown in FIG. 1, base station 104a transmits to terminal 106a on the forward link, base station 104b transmits to terminals 106b, 106c, and 106i, and so on. Terminal 106b is in soft handoff and receives transmissions from base stations 104b and 104d. In FIG. 1, a solid line with an arrow indicates a user-specific data transmission from the base station to the terminal. A broken line with an arrow indicates that the terminal is receiving pilot and other signaling, but no user-specific data transmission, from the base station. The reverse link communication is not shown in FIG. 1 for simplicity.

Figure 2:
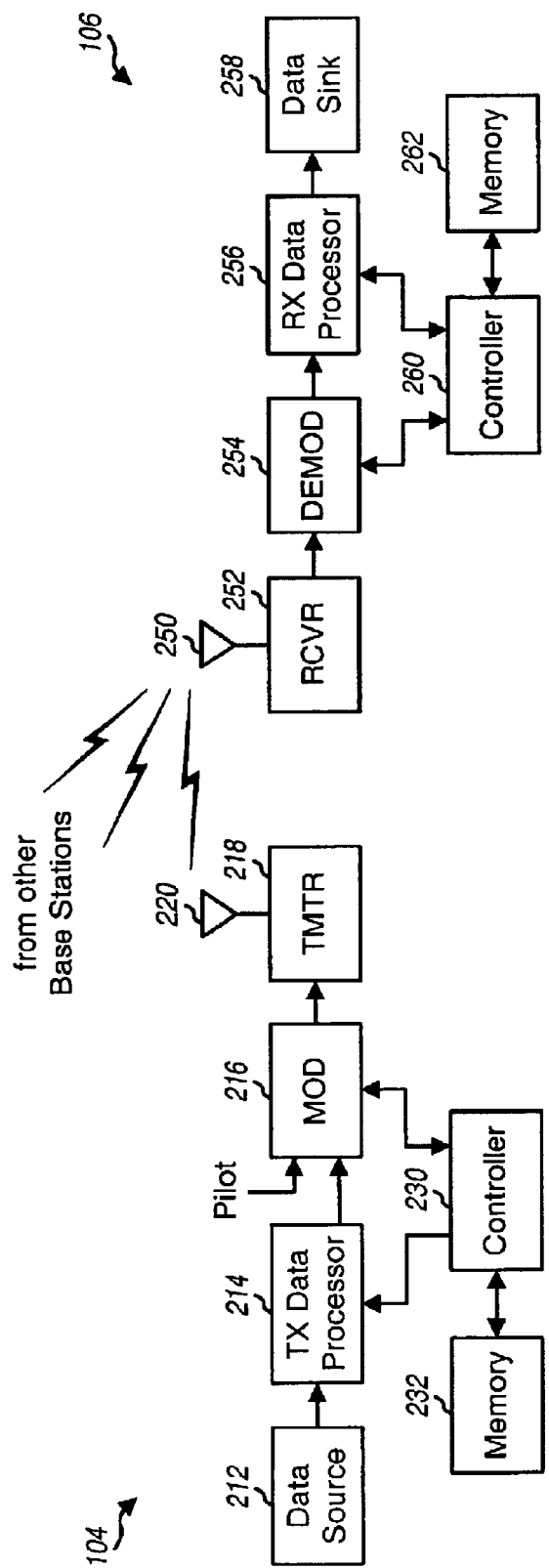
FIG. 2 is a block diagram of an embodiment of a base station and a terminal.

FIG. 2 is a simplified block diagram of an embodiment of base station 104 and terminal 106. On the forward link, at base station 104, a transmit (TX) data processor 214 receives different types of traffic such as user-specific data from a data source 212, messages from a controller 230, and so on. TX data processor 214 then formats and codes the data and messages based on one or more coding schemes to provide coded data. Each coding scheme may include any combination of cyclic redundancy check (CRC), convolutional, Turbo, block, and other coding, or no coding at all. Typically, different types of traffic are coded using different coding schemes.

A modulator (MOD) 216 then receives pilot data and the coded data from TX data processor 214 and further processes the received data to provide modulated data. For a CDMA system, modulator 216 "covers" the coded and pilot data with different channelization codes to channelize the user-specific data, messages, and pilot data onto their respective code channels. For a CDMA system, modulator 216 further spectrally spreads the channelized data with a (complex) pseudo-random number (PN) sequence having a particular offset assigned to the base station. The modulated data is then provided to a transmitter (TMTR) 218 and conditioned (e.g., converted to one or more analog signals, amplified, filtered, and quadrature modulated) to generate a modulated signal that is suitable for transmission via an antenna 220 and over a wireless link to the terminals.

At terminal 106, the modulated signal is received by an antenna 250 and provided to a receiver (RCVR) 252 (which may also be referred to as a "front-end" unit). Receiver 252 conditions (e.g., filters, amplifies, and quadrature downconverts) the received signal and further digitizes the conditioned signal to provide samples. A demodulator (DEMOD) 254 then receives and processes the samples to provide demodulated data. The received signal may include a number of multipath components for a number of base stations. For each multipath component to be processed, demodulator 254 (1) spectrally despreads the samples with the PN sequence used to spectrally spread the data at the base station, (2) "decovers" the despread samples to channelize the received data and messages onto their respective code channels, and (3) data demodulates the channelized data with a pilot recovered for the multipath component. Demodulator 254 may implement a rake receiver that can concurrently process a number of multipath components, as described below.

A receive (RX) data processor 256 then receives and decodes the demodulated data from demodulator 256 to recover the user-specific data and messages transmitted on the forward link. The processing by demodulator 254 and RX data processor 256 is complementary to that performed by modulator 216 and TX data processor 214, respectively, at base station 104.

The terminology used to describe the processing performed by modulator 216 at the base station and demodulator 254 at the terminal may be different for different CDMA standards. For a W-CDMA system, the channelization is referred to as "spreading" and the spectral spreading is referred to as "scrambling". The channelization codes for the "spreading" are orthogonal variable spreading factor (OVSF) codes, and the PN sequences for the "scrambling"

are referred to as scrambling codes. For an IS-95 or IS-2000 system, the channelization is referred to as "covering" and the spectral spreading is referred to as "spreading". The channelization codes for the "covering" are Walsh codes or quasi-orthogonal codes, and the PN sequences for the "spreading" are referred to as PN sequences.

The ROM-based PN generation techniques described herein may be used for various CDMA standards and designs. For clarity, various aspects and embodiments of the ROM-based PN generation are specifically described for the W-CDMA standard.

Figure 3:
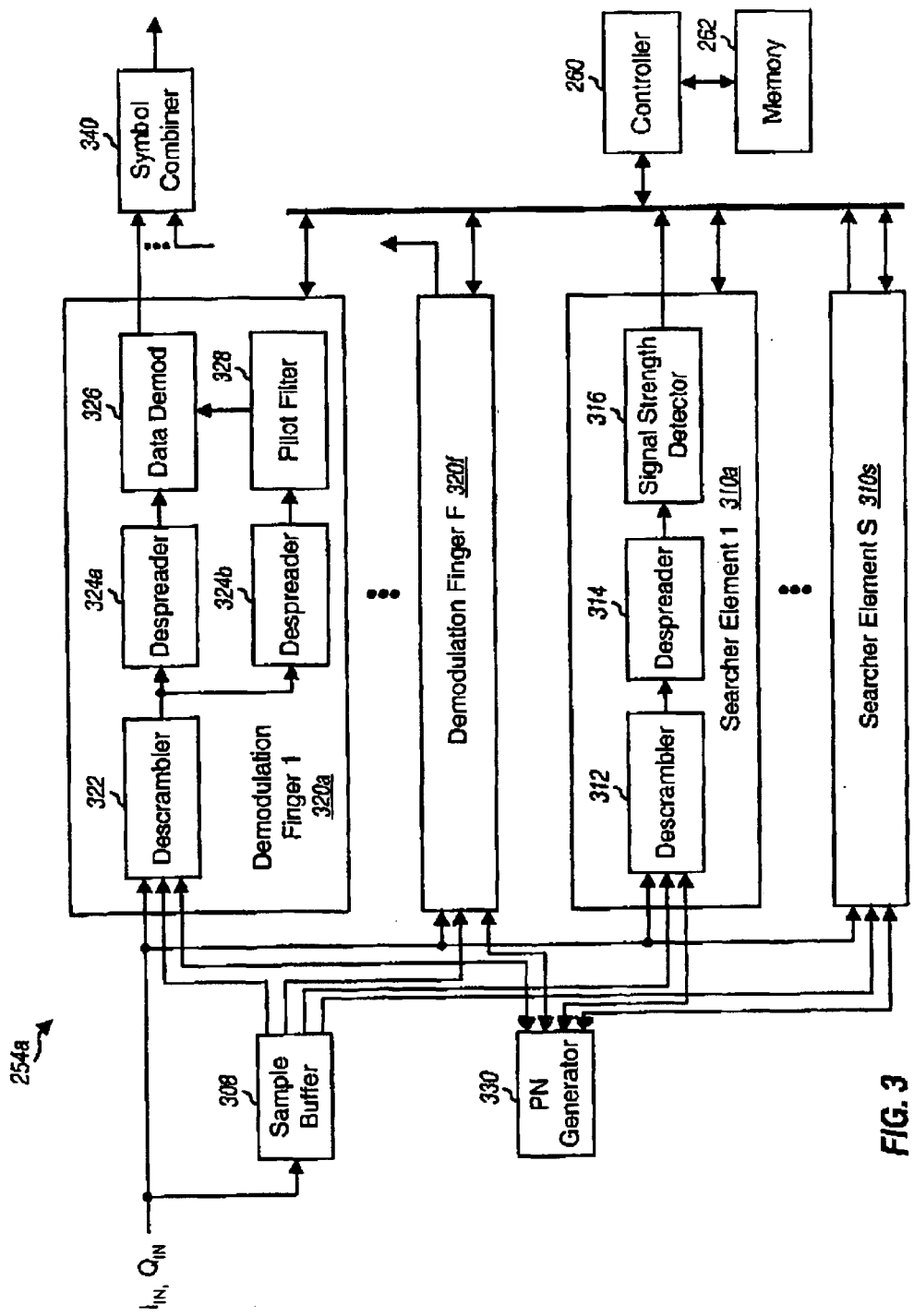
FIG. 3 is a block diagram of a demodulator that implements a rake receiver.

FIG. 3 is a block diagram of a demodulator 254a that includes a ROM-based PN generator. Demodulator 254a, which is one embodiment of demodulator 254 in FIG. 2, may be used to search for strong multipath components in the received signal and to demodulate one or more multipath components of sufficient strength. Demodulator 254a implements a rake receiver that includes S searcher elements 310 (or simply "searchers") and F demodulation elements 320 (or demodulation fingers or simply "fingers"), where S and F can each be any integer one or greater.

The modulated signal transmitted from each base station may be received by a given terminal via multiple propagation paths. The received signal at the terminal may thus include a number of multipath components for one or more base stations. Each searcher 310 may be used to search for strong multipath components in the received signal and to provide an indication of the strength and timing of each found multipath component that meets one or more criteria. Typically, each searcher 310 searches for the pilots transmitted from the base stations to find these multipath components.

One finger 320 may then be assigned to process each multipath component of interest (e.g., as determined by controller 260 based on the signal strength and timing information provided by searchers 310). For example, each multipath component of sufficient strength may be assigned to, and processed by, a respective finger of the rake receiver. Each finger processes (e.g., descrambles, despreads, and data demodulates) the assigned multipath component to provide demodulated symbols for that multipath component. The demodulated symbols from all assigned fingers for a particular data transmission may then be combined to provide recovered symbols for that data transmission.

As shown in FIG. 3, the complex samples (i.e., the inphase $I_{IN}$ and quadrature $Q_{IN}$ samples) from receiver 252 may be provided directly to all assigned fingers 320 and to a sample buffer 308. Buffer 308 stores the samples for subsequent processing by searchers 310 and fingers 320, and provides the stored samples to each searcher 310 and each finger 320 as they are needed. The stored samples may be processed by the fingers for some offline processing.

Each searcher 310 operates in conjunction with controller 260 and a PN generator 330. Within each activated searcher 310, the pertinent complex samples are retrieved from sample buffer 308 and provided to a descrambler 312. Typically, the searcher is designed to process a segment of samples at a time, in which case a corresponding PN vector is provided to the despreader by PN generator 330. The PN vector has a specific offset corresponding to a hypothesis being evaluated. For W-CDMA, this PN vector is a short segment of a scrambling sequence or code.

Descrambler 312 performs a complex multiply of the complex samples with the complex PN sequence and provides complex descrambled samples. The descrambled samples are further despread with a channelization code for the pilot (which is OVSF code of zero in W-CDMA) to provide pilot samples. A signal strength detector 316 then estimates the signal strength of the pilot for the hypothesis being evaluated, and provides the estimated signal strength to controller 260.

Within each assigned finger 320, the complex samples are provided to a descrambler 322, which also receives a complex PN sequence from PN generator 330. The PN sequence has a specific offset that is dependent on the time of arrival of the multipath component being processed and the offset of the PN sequence used at the transmitter. This arrival time (or PN offset) may be initially determined by the searcher and thereafter tracked by the finger. Descrambler 322 performs a complex multiply of the samples with the PN sequence and provides descrambled samples, which are further despread by despreaders 324a and 324b with the charmelization codes for the user-data and the pilot, respectively. The pilot samples from despreader 324b are further filtered by a pilot filter 328 to provide a pilot estimate. A data demodulator 326 then demodulates the despread samples from despreader 324a with the pilot estimate to provide demodulated symbols for the assigned multipath component.

A symbol combiner 340 combines the demodulated symbols from all fingers assigned to process a given data transmission. Symbol combiner 340 then provides recovered symbols, which may be decoded to recover the transmitted data. The design and operation of a rake receiver such as that shown in FIG. 3 is described in further detail in the U.S. Pat. Nos. 5,764,687 and 5,490,165, which are incorporated herein by reference.

In the embodiment shown in FIG. 3, PN generator 330 provides the PN sequences for all active searchers 310 and fingers 320. For W-CDMA, these PN sequences are referred to as scrambling codes. In accordance with document 3GPP TS 25.213 V3.6.0 of the W-CDMA standard, a total of $2^{18}-1=262,143$ possible scrambling codes can be generated and are labeled as scrambling codes k=0 . . . 262,142. However, only some of these scrambling codes may be used for scrambling, and these "usable" scrambling codes are divided into 512 sets. Each set includes one primary scrambling code and 15 secondary scrambling codes.

The 512 primary codes in the 512 sets are scrambling codes k=16*i, where i=0 . . . 511. The 15 secondary scrambling codes in the i-th set are scrambling codes k=16*i+j, where j=1 . . . 15. There is a one-to-one mapping between each primary scrambling code and its associated set of 15 secondary scrambling codes such that i-th primary scrambling code corresponds to i-th set of secondary scrambling codes.

The 512 sets include scrambling codes k=0 . . . 8191. Each of these "regular" scrambling codes is associated with a left alternative scrambling code and a right alternative scrambling code, both of which may be used for "compressed" frames. (For a compressed frame, data is transmitted in a portion of the frame so that the remaining portion of the frame may be used to perform inter-system measurements.) The left alternative scrambling code corresponding to regular scrambling code k is scrambling code k+8192, and the right alternative scrambling code corresponding to regular scrambling code k is scrambling code k+16,384.

Table 1 shows the scrambling codes defined by W-CDMA.

TABLE 1

| Code Name | Code Number | Total Number of Codes |
|---|---|---|
| Regular Scrambling Codes | | 8192 (512 × 16) |
| Primary Scrambling Codes | k = 16 * i (i = 0, 1, . . . 511) | 512 (512 sets, 1 per set) |
| Secondary Scrambling Codes | k = 16 * i + j (i = 0, 1, . . . 511 j = 1, 2, . . . 15) | 512 × 15 (512 sets, 15 per set) |
| Left Alternative Scrambling Codes | k + 8192 (k = 0, 1, . . . 8191) | 8192 |
| Right Alternative Scrambling Codes | k + 16,384 (k = 0, 1, . . . 8191) | 8192 |

Figure 4:
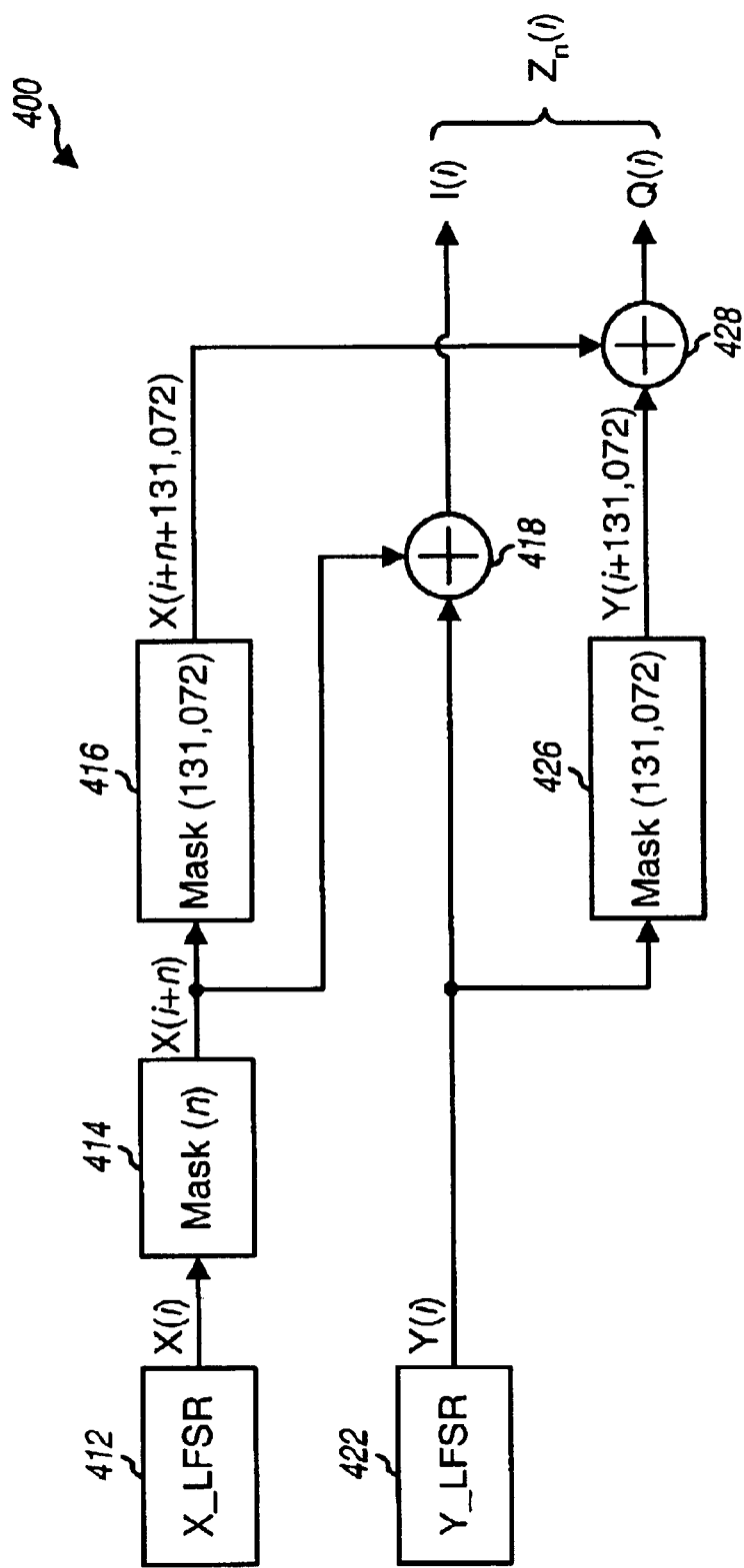
FIG. 4 is a block diagram of a scrambling code generator for W-CDMA.

FIG. 4 is a block diagram of a scrambling code generator 400 for W-CDMA. The scrambling codes used for W-CDMA are gold codes that are generated with two linear feedback shift registers, X_LFSR 412 and Y_LFSR 422. X_LFSR 412 implements the primitive (over GF(2)) polynomial $1+x^7+x^{18}$, and Y_LFSR 422 implements the polynomial $1+x^5+x^7+x^{10}+x^{18}$. Each LFSR generates a specific PN sequence of length $2^{18}-1$, with the bit pattern being determined by the assigned polynomial. X_LFSR 412 and Y_LFSR 422 are initialized as follows:

$x(0)=1, x(1)=x(2)= \ldots x(17)=0$, and $y(0)=y(1)=y(2)= \ldots y(17)=1$, where x(m) and y(m) are the output of the m-th delay elements in the X_LFSR and Y_LFSR, respectively. The output from the 17-th delay element, x(17), after the i-th shift is denoted as X(i), and the output from the 17-th delay element, y(17), after the i-th shift is denoted as Y(i).

For W-CDMA, different scrambling codes can be generated by (1) shifting the X_LFSR while keeping the Y_LFSR fixed and (2) combining the shifted output from the X_LFSR and the output from the Y_LFSR. The output from X_LFSR 412, which is denoted as X(i), is thus shifted by a mask unit 414 by n chips to provide the shifted output, X(i+n). The parameter n for mask unit 414 determines the number of PN chips to shift X(i), with each PN shift corresponding to a different scrambling code number. Since there are a total of 24,576 scrambling codes (i.e., 8192×3) that may be used in W-CDMA, n ranges from 0 to 24,575 and represents a 15-bit scrambling code number. The shifted output, X(i+n), is further shifted by a mask unit 416 by 131,072 chips to provide a shifted output, X(i+n+131,072). Similarly, the output from Y_LFSR 422, which is denoted as Y(i), is shifted by a mask unit 426 by 131,072 chips to provide a shifted output, Y(i+131,072). The masking operation performed by the mask units to shift the PN sequences is known in the art and not described in detail herein.

The output X(i+n) from mask unit 414 and the output Y(i) from Y_LFSR 422 are added by a modulo-2 adder 418 to provide an inphase scrambling code, I(i). Correspondingly, the output X(i+n+131,072) from mask unit 416 and the output Y(i+131,072) from mask unit 426 are added by a modulo-2 adder 428 to provide a quadrature scrambling code, Q(i). I(i) and Q(i) are components of a complex scrambling code, $Z_n(i)$, which may be expressed as $Z_n(i)=I(i)+jQ(i)$.

For W-CDMA, each scrambling code has a length of 38,400 chips, which is the duration of one 10 msec frame. Thus, the index i in the I(i) and Q(i) sequences ranges from 0 to 38,399. For any given scrambling code n, the bit pattern for i=0 . . . 38,399 is repeated for each frame to provide a continuous sequence. As shown in FIG. 4, I(i) is generated based on X(i+n) and Y(i), and Q(i) is generated based on X(i+n+131,072) and Y(i+131,072), where n ranges from 0 to 24,575.

In a specific implementation of the ROM-based PN generator, all bit values for X(i+n) and X(i+n+131,072) needed to derive valid scrambling codes are stored in an X_ROM, and all bit values for Y(i) and Y(i+131,072) needed to derive valid scrambling codes are stored in a Y_ROM, where i=0 . . . 38,399 and n=0 . . . 24,575. The I(i) and Q(i) sequences for any given scrambling code n may then be generated by retrieving the proper bit values for X(i) and Y(i) from the X_ROM and Y_ROM, and combining the retrieved bit values.

To generate I(i), the X_ROM may be designed to store the bit values X(0) . . . X(62,975), where 62,975=38,400+24,576-1, and the Y_ROM may be designed to store the bit values Y(0) . . . Y(38,399). To generate Q(i), the X_ROM may be designed to store the values X(131,072) . . . X(194,047), where 194,047=131,072+38,400+24,576-1, and the Y_ROM may be designed to store the values Y(131,072) . . . Y(169,471), where 169,471=131,072+38,400-1.

In an embodiment, the ROM-based PN generator is designed with the capability to provide a "PN vector" for a particular scrambling code n for each clock cycle. In an embodiment, the PN vector comprises an 8-bit vector for I(i) and an 8-bit vector for Q(i), and may be used for descrambling by a finger or searcher. In an embodiment, the PN vector is provided for a particular PN phase p that is aligned to an 8-chip boundary (i.e., p=0, 8, 16, . . . or 38,392). The PN vector may be generated based on (1) 8 bits for X(n+p) through Y(n+p+7) and 8 bits for X(n+p+131,072) through X(n+p+131,079) from the X_ROM, and (2) 8 bits for Y(p) through Y(p+7) and 8 bits for Y(p+131,072) through Y(p+131,079) from the Y_ROM.

Figure 5:
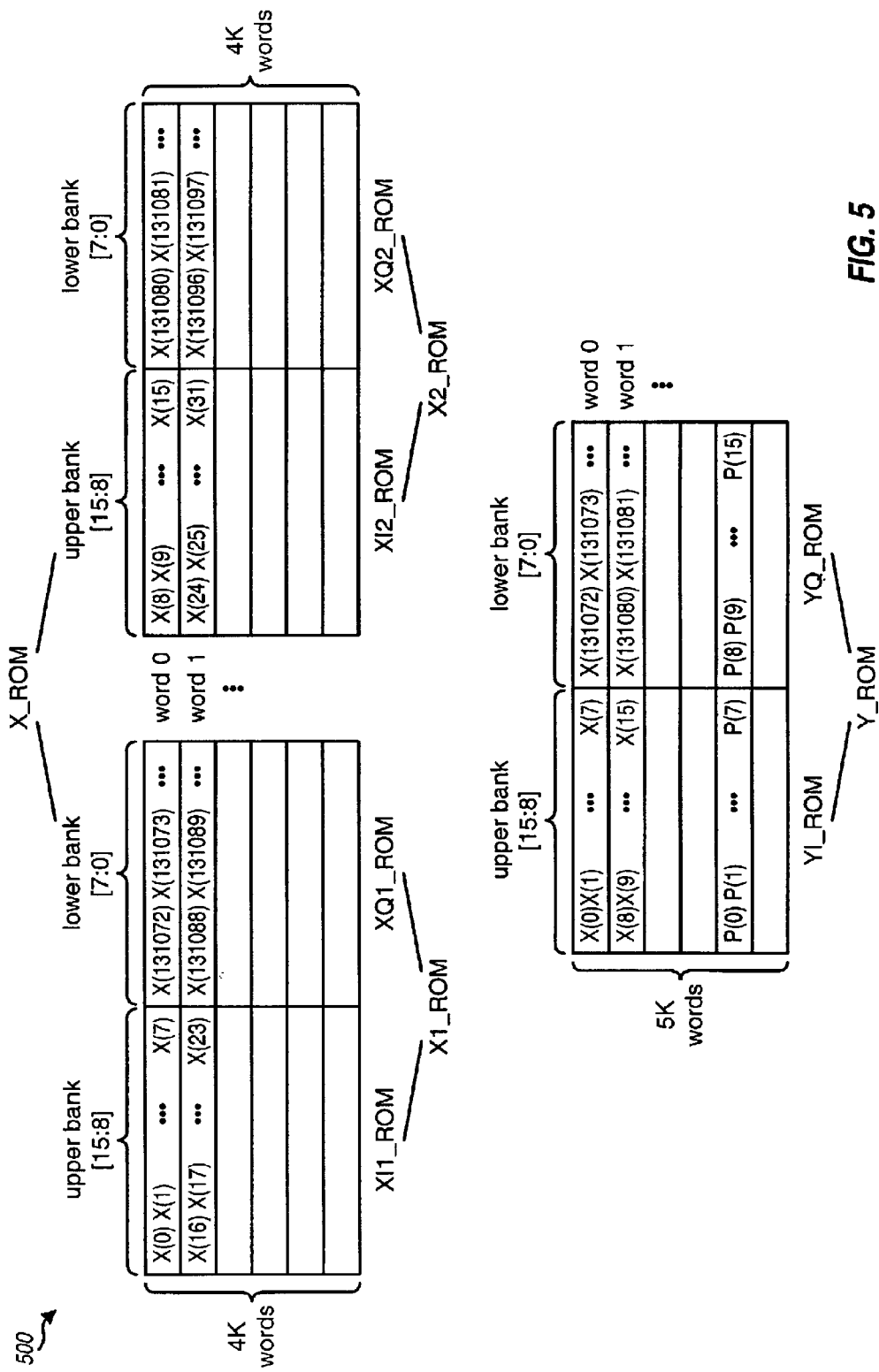
FIG. 5 is a block diagram of a specific embodiment of a bank of ROMs that store the X(i) and Y(i) bit values used to generate PN vectors for W-CMDA.

FIG. 5 is a block diagram of a specific embodiment of a bank of ROMs 500 used to store the X(i) and Y(i) bit values used to generate the PN vectors for W-CMDA. In a specific implementation, each individual ROM is able to provide a 16-bit word for each read cycle.

In an embodiment, the X_ROM is implemented with two 4K×16 ROMs, X1_ROM and X2_ROM. The X1_ROM is further partitioned into an upper bank labeled as XI1_ROM and a lower bank labeled as XQ1_ROM. The XI1_ROM stores the even numbered bytes of the sequence X(0) . . . X(62,975), and the XQ1_ROM stores the even numbered bytes of the sequence X(131,072) . . . X(194,047), as shown in FIG. 5. The X2_ROM is similarly partitioned into an upper bank labeled as XI2_ROM and a lower bank labeled as XQ2_ROM. The XI2_ROM stores the odd numbered bytes of the sequence X(8) . . . X(62,975), and the XQ2_ROM stores the odd numbered bytes of the sequence X(131,080) . . . X(194,047). Each row of the X1_ROM and X2_ROM stores one 16-bit word.

For the implementation of the X_ROM shown in FIG. 5, a 16-bit word of the sequence X(0) . . . X(62,975) may be retrieved from the XI1_ROM and XI2_ROM for each read cycle, and an 8-bit vector corresponding to the desired scrambling code n may be extracted from the retrieved word. Similarly, a 16-bit word of the sequence X(131,072) . . . X(194,047) may be retrieved from the XQ1_ROM and XQ2_ROM for each read cycle, and an 8-bit vector corresponding to the desired scrambling code n may also be extracted from this retrieved word. Thus, by using two ROMs each with the capability to provide a 16-bit output for each read cycle, two 8-bit vectors at any offset may be obtained and used to generate the PN vector for any desired scrambling code.

In an alternative implementation, the entire sequence X(0) . . . X(62,975) may be stored in the X1_ROM, and the entire sequence X(131,072) . . . X(194,047) may be stored in the X2_ROM. For this implementation, for each PN vector to be generated, up to two 16-bit words are retrieved from each of the X1_ROM and X2_ROM, and an 8-bit vector corresponding to the desired scrambling code is then extracted from the retrieved 16-bit words. The number of words to be retrieved is dependent on whether the 8 bits needed from the X1_ROM are stored in one or two words, which in turn is dependent on the code number.

In an embodiment, the Y_ROM is implemented with one 5K×16 ROM. The Y_ROM is partitioned into an upper bank labeled as YI_ROM and a lower bank labeled as YQ_ROM. The YI_ROM stores all bytes of the sequence Y(0) . . . Y(38,399), and the YQ_ROM stores all bytes of the sequence Y(131,072) . . . Y(169,471), as shown in FIG. 5. Since the PN vectors to be provided by the ROM-based PN generator are aligned at 8-chip boundary, one 16-bit word is retrieved from the Y_ROM at the PN phase p for each read cycle and may be used to generate both the inphase I(i) and quadrature Q(i) components of the PN vector.

The following parameters may be used to derive the PN vector for the desired scrambling code n at the desired PN phase p:

pn_cnt_x8—the PN count value that is indicative of the current PN phase for a given scrambling code (given with chipx8 or ⅛ chip resolution);

baddr—the phase p of the PN vector (given with 8-chip resolution); and codenum—the scrambling code n.

The pn_cnt_x8 may be maintained by each finger/searcher for the multipath component being processed by that finger/searcher. In an embodiment, a system timer is maintained by the receiver and provides a system reference count value, ref_cnt, which is indicative of system time and provided with chipx8 resolution. All timing for the receiver may then be referenced to this system reference count value. For a given finger/searcher, pn_cnt_x8 may be expressed as:

$$pn\_cnt\_x8 = (ref\_cnt - tar\_pos + adv - ret) \bmod (38{,}400*8), \quad \text{Eq (1)}$$

where tar_pos is the difference between the system reference time and the phase of the PN sequence used for descrambling;

adv is the amount to advance the PN sequence; and ret is the amount to retard or delay the PN sequence.

In equation (1), adv and ret are used to adjust the phase of the PN sequence to account for changes in the arrival time of the multipath component being processed by the finger (adv and ret may be set to zero for the searchers). As shown in equation (1), since the PN sequence has a periodicity of 38,400 chips in W-CDMA, pn_cnt_x8 also has a period of 38,400 chips and is reset when it reaches the end of the sequence, which is performed for by the mod (38,400*8) operation.

Since pn_cnt_x8 has chipx8 resolution and baddr has 8-chip resolution, baddr may be obtained by discarding the 6 least significant bits (LSBs) of pn_cnt_x8, as follows:

$$baddr[12{:}0] = pn\_cnt\_x8[18{:}6]. \quad \text{Eq (2)}$$

Since the finger and searcher require the PN generator to provide the PN vector for the next 8-chip period, and not the current 8-chip period, the PN generator is provided with the phase for the next PN vector, which may be computed as:

$$baddr[12{:}0] = (pn\_cnt\_x8[18{:}6] + 1) \bmod 4800.$$

Each finger/searcher that desires a PN vector provides the baddr and codenum to the PN generator.

To generate a PN vector for scrambling code codenum with phase baddr, the start bit address for the X(i) vector used to generate the PN vector can be computed as:

$$x\_addr = codenum + (baddr * 8). \quad \text{Eq (3)}$$

The byte address for the X(i) vector is then:

$$x\_baddr = x\_addr[12{:}3]. \quad \text{Eq (4)}$$

As shown in FIG. 5, for each 8-bit PN vector, a 16-bit word for XI is retrieved from both the XI1_ROM and XI2_ROM, and a 16-bit word for XQ is retrieved from both the XQ1_ROM and XQ2_ROM.

If x_baddr is an even numbered address (i.e., x_baddr[0]=0), then the same word address may be used for both X1_ROM and X2_ROM, which is:

$$x1\_waddr = x2\_waddr = x\_baddr[12{:}1]. \quad \text{Eq (5)}$$

Two 16-bit words are then retrieved from the X1_ROM and X2_ROM at word addresses x1_waddr and x2_waddr, respectively, as follows:

$$x1\_data = X1\_ROM[x1\_waddr], \text{ and} \quad \text{Eq (6)}$$

$$x2\_data = X2\_ROM[x2\_waddr].$$

The 16-bit words for XI and XQ are then obtained from the retrieved words, as follows:

$$xi\_word = \{(x1\_data[15{:}8] \,\&\, x2\_data[15{:}8]), \text{ and} \quad \text{Eq (7)}$$

$$xq\_word = \{(x1\_data[7{:}0] \,\&\, x2\_data[7{:}0]).$$

Of the 16 bits retrieved from the X1_ROM and X2_ROM for the words xi_data and xq_data, only 8 bits of each word are used to generate the PN vector. The offset of these 8 bits in the word can be determined as:

$$x\_data\_sel = x\_addr[2{:}0]. \quad \text{Eq (8)}$$

The two bytes, xi_data and xq_data, used to generate the PN vector can then be obtained as:

$$xi\_data = \{xi\_word << x\_data\_sel\}[15{:}8], \text{ and} \quad \text{Eq (9)}$$

$$xq\_data = \{xq\_word << x\_data\_sel\}[15{:}8].$$

The xi_data and xq_data bytes are obtained by shifting the xi_word and xq_word to the left by x_data_sel bit positions, discarding the x_data_sel bits that have been shifted out of the words, and retaining the upper byte of the words.

If x_baddr is an odd number (i.e., x_baddr[0]=1), then different word addresses are used for X1_ROM and X2_ROM, which are:

$$x1\_waddr = x\_baddr[12{:}1] + 1, \text{ and} \quad \text{Eq (10)}$$

$$x2\_waddr = x\_baddr[12{:}1].$$

Two 16-bit words are then retrieved from the X1_ROM and X2_ROM at word addresses x1_waddr and x2_waddr, as shown in equation (6). The 16-bit words for XI and XQ are then obtained from the retrieved words, as follows:

$$xi\_word = \{(x2\_data[15:8] \ \& \ x1\_data[15:8]), \text{ and} \quad \text{Eq (11)}$$

$$xq\_word = \{(x2\_data[7:0] \ \& \ x1\_data[7:0]).$$

It can be noted that the bytes are concatenated together in a different order in equation (11) than that shown for equation (7). The two bytes, xi_data and xq_data, used to generate the PN vector can then obtained as shown in equation (9).

The start bit address for the Y(i) vector used to generate the desired PN vector and the word address for the Y_ROM are similarly computed as:

$$y\_addr = codenum + (baddr * 8), \text{ and} \quad \text{Eq (12)}$$

$$y\_waddr = y\_addr[12:3].$$

The 16-bit word retrieved from the Y_ROM is then:

$$y\_data = Y\_ROM[y\_waddr]. \quad \text{Eq (13)}$$

The two bytes, yi_data and yq_data, used to generate the PN vector can then be obtained as:

$$yi\_data = y\_data[15:8], \text{ and} \quad \text{Eq (14)}$$

$$yq\_data = y\_data[7:0].$$

Since the PN vector is provided at the 8-chip boundary, only one word needs to be retrieved from the Y_ROM for y_data, which includes both yi_data and yq_data. Moreover, no shifting of y_data is needed to obtain yi_data and yq_data.

The PN vector can then be generated as follows:

$$pni\_data = xi\_data \text{ XOR } yi\_data, \text{ and} \quad \text{Eq (15)}$$

$$pnq\_data = xq\_data \text{ XOR } yq\_data,$$

where pni_data and pnq_data are 8-bit vectors of the I(i) and Q(i) sequences, respectively, for scrambling code number n (i.e., codenum) and PN phase p (i.e., baddr).

In an embodiment, a primary synchronization code (PSC) may also be provided by the ROM-based PN generator. The PSC is a specific 256-chip sequence that is inserted at the start of each (0.667 msec) slot in a primary common control physical channel (P-CCPCH) in W-CDMA. The PSC is further XORed with a value of one ("1") or zero ("0") depending on whether or not STTD mode is enabled. The PSC may thus be used by the receiver to (1) determine the start of each slot and (2) detect whether or not STTD mode is enabled.

In an embodiment, the 256-chip PSC is stored in the last 256 bit positions (i.e., the last 16 words) in the Y_ROM. This Y_ROM is then designed with sufficient size to store the 38,400 bit values for Y(i) as well as the 256 bit values for the PSC. The address of a PSC word in the Y_ROM may be computed as:

$$psc\_waddr = psc\_saddr + y\_addr[7:4], \quad \text{Eq (16)}$$

where psc_saddr is the start word address where the PSC is stored in the Y_ROM (e.g., psc_saddr=5K−16, where 5K is the highest word address for the Y_ROM). The 16-bit word retrieved from the Y_ROM for the PSC is then:

$$psc\_word = Y\_ROM[psc\_waddr]. \quad \text{Eq (17)}$$

A 16-bit PSC word comprised of two 8-bit PSC vectors is retrieved from the Y_ROM for each read cycle. However, only one PSC vector needs to be provided by the PN generator for a given clock cycle. The particular PSC vector to be provided is determined by y_baddr. In particular, the PSC vector for the upper byte of the psc_word is provided if y_baddr[0] is an even number, and the PSC vector for the lower byte of the psc_word is provided if y_baddr[0] is an odd number. This may be expressed as follows:

$$psc\_data = psc\_word[15:8], \text{ if } y\_baddr[0] \text{ is an even number, and} \quad \text{Eq (18)}$$

$$psc\_data = psc\_word[7:0], \text{ if } y\_baddr[0] \text{ is an odd number}.$$

Figure 6:
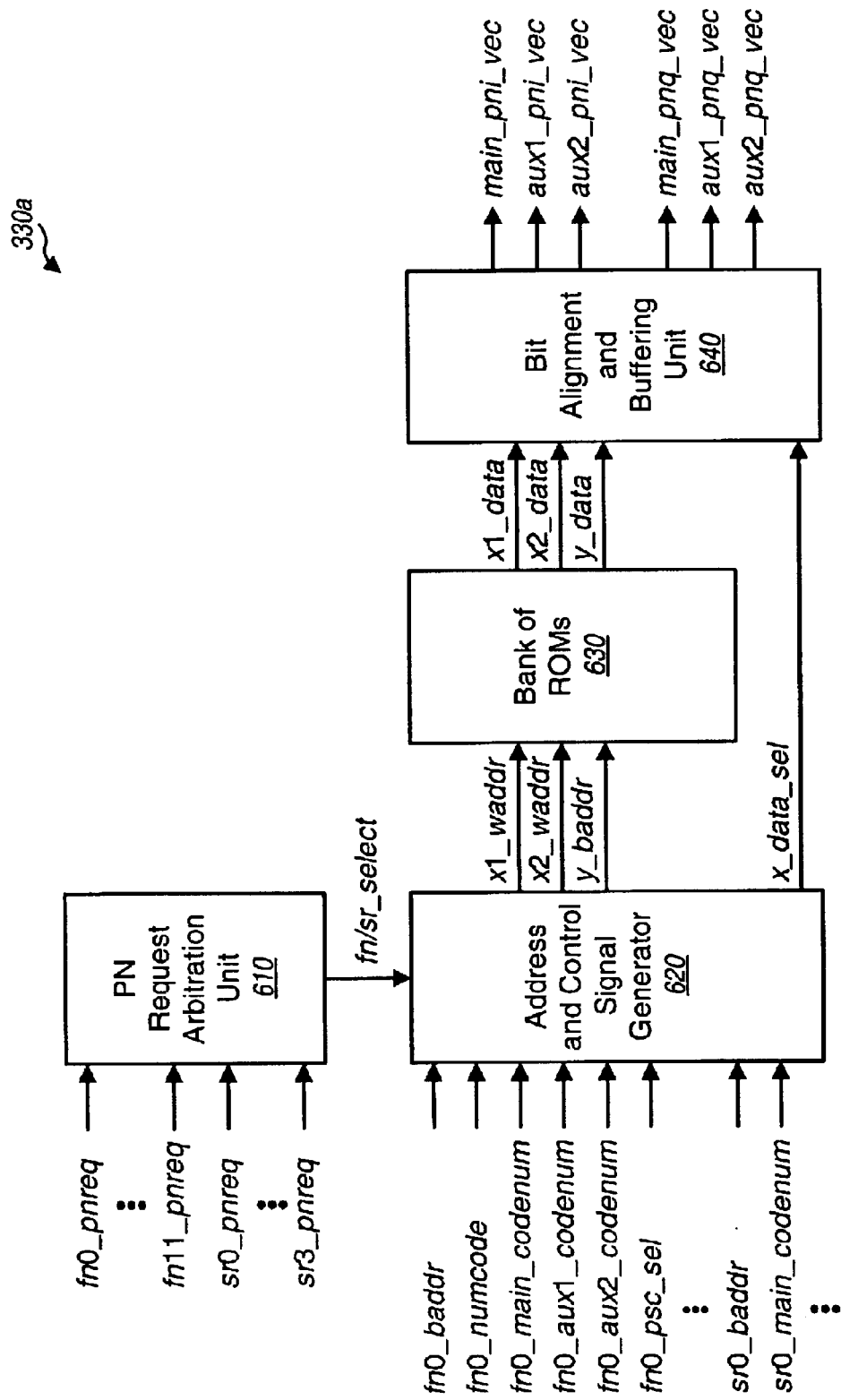
FIG. 6 is a block diagram of an embodiment of a ROM-based PN generator.

FIG. 6 is a block diagram of a specific embodiment of a ROM-based PN generator 330a. PN generator 330a, which is one embodiment of PN generator 330 in FIG. 3, includes a PN request arbitration unit 610, an address and control signal generator 620, a bank of ROMs 630, and a bit alignment and buffering unit 640.

Request arbitration unit 610 receives requests for PN vectors from all active fingers and searchers, selects one PN request for processing at any given moment, and provides a control indicative of the selected request. For each PN request selected for processing, address and control signal generator 620 determines the proper ROM addresses (which are dependent on the desired scrambling code and PN count value) and further provides the necessary ROM controls. ROMs 630 store the necessary portions of the X(i) and Y(i) sequences and the entire PSC sequence, and provide the proper X(i), Y(i), and/or PSC words at the ROM addresses provided by generator 620. Bit alignment and buffering unit 640 receives the X(i) and Y(i) words, shifts the X(i) word based on the scrambling code number, derives the PN vector or the PSC vector, and provides buffering for the output vector. Each of units 610, 620, and 640 is described in further detail below.

In an embodiment, each finger/searcher provides a request whenever it desires a set of one or more PN vectors for descrambling. The request from each finger may be provided via a respective request signal, fnx_pnreq, where x=0, 1, ... (F−1). Similarly, the request from each searcher may be provided via a respective request signal, srx_pnreq, where x=0, 1, ... (S−1).

Each finger may request up to three PN vectors for a given PN request. The three PN vectors are for a main scrambling code, a first auxiliary scrambling code, and a second auxiliary scrambling code. The main scrambling code is one of the primary scrambling codes in Table 1, and the first and second auxiliary scrambling codes may each be a secondary scrambling code, a left alternative scrambling code, or a right alternative scrambling code. Each finger may also request a PN vector (for the main scrambling code) and a PSC vector for a given PN request. Since the PSC is not used simultaneously with the auxiliary scrambling codes for any finger, the address and PSC vector for the PSC may be multiplexed with the address and PN vector, respectively, for the first auxiliary scrambling code. Each searcher requests one PN vector for the primary scrambling code for each PN request.

Each finger and searcher also provide a respective set of parameters needed by the PN generator to provide the proper set of one or more PN vectors. In an embodiment, each finger provides the following parameters:

a PN count value with 8-chip resolution, fnx_baddr, which is indicative of the byte address of the PN vector(s) to be provided for the finger (e.g., fnx_baddr=pn_cnt_x8[18:6]);

the number of PN vectors, fnx_numcode, to be provided for the PN request, which may be 0, 1, or 2;

the main scrambling code number, fnx_main_codenum;

the first auxiliary scrambling code number, fnx_aux1_codenum, if any;

the second auxiliary scrambling code number, fnx_aux2_codenum, if any; and a PSC selection signal, fnx_sc_sel, which indicates whether or not a PSC vector is to be provided to the finger.

In an embodiment, each searcher provides the following parameters:

a PN count value with 8-chip resolution, srx_baddr, which is indicative of the byte address of the PN vector to be provided for the searcher; and the main scrambling code number, srx_main_codenum.

A specific design for units 610, 620, and 640 of ROM-based PN generator 330*a* is described below. In general, the ROM-based PN generator may be designed to support any number of fingers and any number of searchers. For clarity, the specific design described below supports 12 fingers and 4 searchers (i.e., F=12, and S=4). In general, the ROM-based PN generator may be designed to provide PN vectors of any length. For clarity, each PN vector covers 8 chips in the specific design described below.

Figure 7:
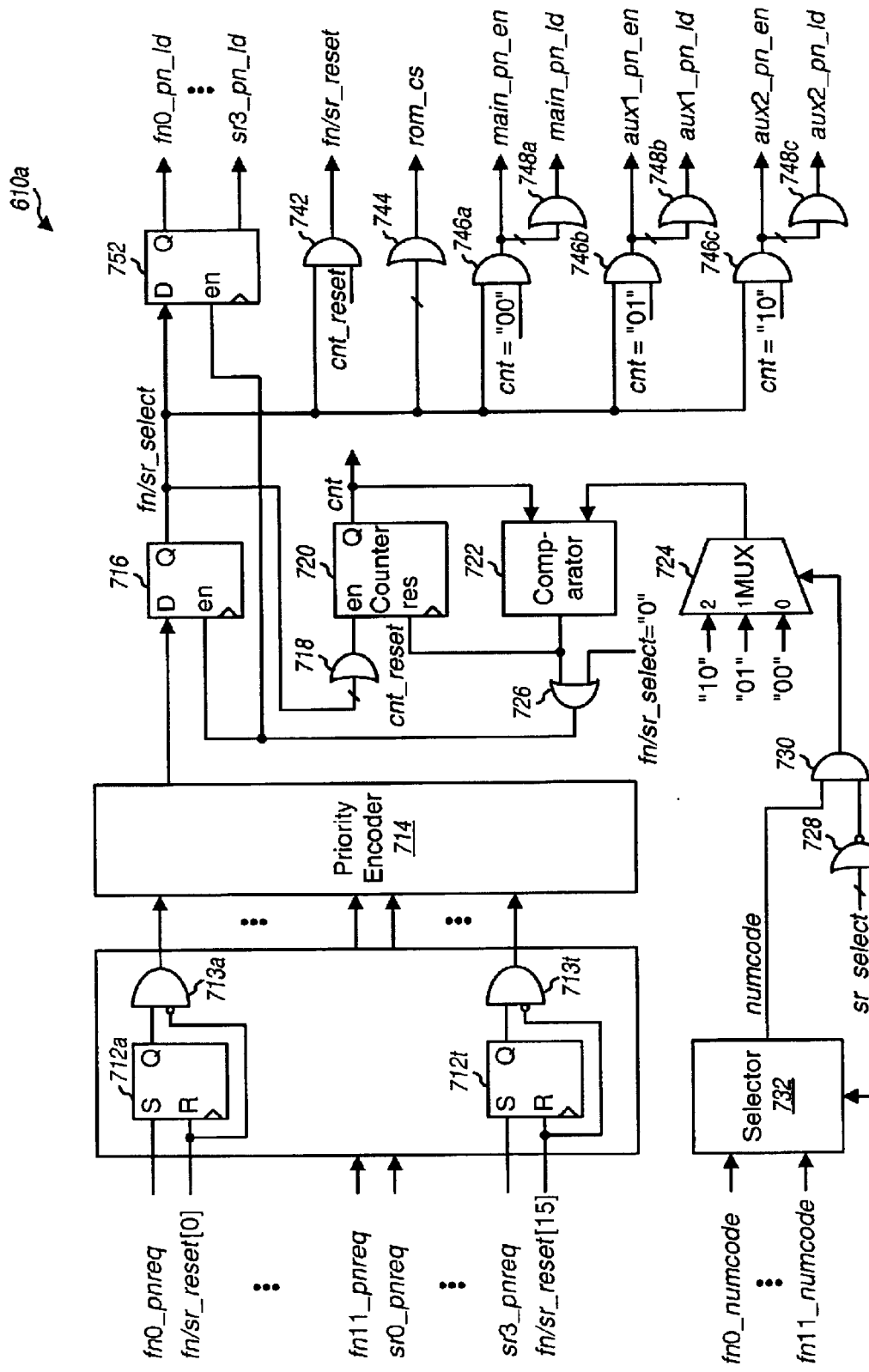
FIGS. 7, 8, and 9 are block diagrams of an embodiment of a request arbitration unit, an address and control signal generator, and a bit alignment and buffering unit, respectively, within the ROM-based PN generator.

FIG. 7 is a block diagram of a request arbitration unit 610*a*, which is one embodiment of request arbitration unit 610 in FIG. 6. Request arbitration unit 610*a* receives requests from all fingers and searchers desiring PN vectors. Since a PN vector covers an 8-chip period, one PN request may be provided by each active finger/searcher to request arbitration unit 610*a* for each 8-chip period.

In the embodiment shown in FIG. 7, the PN request from each finger/searcher is provided to the "S" input of a respective S-R register 712 and used to set the register output. Each S-R register 712 is reset by a respective reset signal, fn/sr_reset[x], provided to the "R" input of the register. The output of each register 712 and the reset signal for the register are respectively provided to a non-inverting input and an inverting input of a corresponding AND gate 713. The outputs from all AND gates 713*a* through 713*t*, which are indicative of "active" requests (i.e., requests that need to be processed) from all fingers and searchers, are provided to a priority encoder 714.

Priority encoder 714 determines the processing order for the active requests based on a particular priority assignment scheme. In an embodiment, the priorities of the fingers and searchers are assigned as follows:

fn0_pnreq> . . . >fn11_pnreq>sr0_pnreq> . . . >sr3_pnreq.

Other priority assignment schemes for the fingers and searchers may also be implemented. Since the PN generator is able to process the requests from all fingers and searchers within an 8-chip period, the particular priority assignment scheme selected for use may not be critical.

Priority encoder 714 provides a control that indicates the specific finger or searcher whose request is to be processed next. This control is latched by a register 716 to provide a fn/sr_select control. In an embodiment, the fn/sr_select control includes 16 bits (i.e., F+S bits), with one bit being assigned to each finger/searcher and used to indicate whether or not that finger/searcher has been selected for processing. The fn/sr_select control is a concatenation of a 12-bit fn_select control and a 4-bit sr_select control (i.e., fr/sr_select=fn_select & sr_select). Only one bit of the fn/sr_select control is set at any given moment based on (1) the active requests pending at that moment and (2) the priority assignment scheme implemented by priority encoder 714. The active request to be processed next is referred to as the selected request.

As noted above, each finger may request up to three PN vectors for each PN request, and each searcher may request a single PN vector for each PN request. A selector 732 receives fn0_numcode through fn11_numcode, which are indicative of the number of PN vectors being requested by the 12 fingers. Selector 732 then selects the fnx_numcode from the finger whose request is being processed, as determined by the fn/sr_select control. The selected fnx_numcode is provided to the selector output and is denoted as numcode.

A counter 720 is used to count through the number of PN vectors to be provided by the PN generator for the selected request. Counter 720 is enabled if any request is being processed, which may be indicated by performing an OR of all 16 bits of the fn/sr_select control using an OR gate 718. The output of counter 720, cnt, is indicative of the number of PN vectors already provided for the selected request. The output of counter 720 is compared by a comparator 722 against the output of a multiplexer 724, which provides a value indicative of the number of PN vectors to be provided for the selected request. If the output of counter 720 is equal to the output of multiplexer 724, indicating that the last PN vector has been generated for the selected request, then comparator 722 provides a reset pulse on a cnt_reset signal. This reset pulse is used to reset counter 720 for the next selected request. The cnt_reset signal is also ORed with the logic value, fn/sr_select="00", by an OR gate 726, and the OR gate output is used to enable register 716. OR gate 726 is used to force register 716 to always be enabled whenever there are no PN requests.

Multiplexer 724 provides "00", "01", or "10" if one, two, or three PN vectors, respectively, are to be provided by the PN generator for the selected request. The 4 bits of the sr_select control are provided to the inputs of a NOR gate 728. The numcode from selector 732 and the NOR gate output are provided to the inputs of an AND gate 730, and the AND gate output is used to select one of the inputs of multiplexer 724. If the selected request is from a searcher, then the output of NOR gate 728 is logic low, the output of AND gate 730 is also logic low, and multiplexer 724 provides "00" to comparator 722. Otherwise, if the selected request is from a finger, then the output of NOR gate 728 is logic high, and the output of AND gate 730 is equal to numcode.

Request arbitration unit 610*a* also generates various controls for other units of the PN generator and for the fingers and searchers. The fn/sr_select control and the cnt_reset signal are provided to an AND gate 742 and used to generate the fn/sr_reset control for S-R registers 712.

The fn/sr_select control and the cnt from counter 720 are also used to provide the access controls for ROMs 630. An OR gate 744 provides a ROM chip select signal, rom_cs, which is active logic high if any request is being processed. The rom_cs signal is asserted for one clock cycle for each PN vector to be provided for the selected request. In particular, the rom_cs signal is asserted for up to three (or numcode) clock cycles for each finger request and for one clock cycle for each searcher request.

An AND gate 746*a* provides the enable control, main_pn_en, for the first PN vector for the main scrambling code. This control is activated when cnt="00". An AND gate 746*b* provides the enable control, aux1_pn_en, for the second PN vector for the first auxiliary scrambling code. This control is activated when cnt="01". An AND gate 746*c* provides the enable control, aux2_pn_en, for the third PN vector for the second auxiliary scrambling code. This control is activated when cnt="10". The 16-bit main_pn_en control includes one bit for each finger and searcher, the 12-bit aux1_pn_en control includes one bit for each finger, and the 12-bit aux2_pn_en control also includes one bit for each finger (since only one PN vector for the main scrambling code is provided for each searcher request).

An OR gate 748*a* performs an OR of all bits of the main_pn_en control to provide a load control, main_pn_ld, for the main scrambling code. An OR gate 748*b* performs an OR of all 12 bits of the aux1_pn_en control to provide a load control, aux1_pn_ld, for the first auxiliary scrambling code. And an OR gate 748*c* performs an OR of all 12 bits of the aux2_pn_en control to provide a load control, aux2_pn_ld, for the second auxiliary scrambling code. The load controls main_pn_ld, aux1_pn_ld, and aux2_pn_ld are used to latch the PN vectors for the main, first auxiliary, and second auxiliary scrambling codes, respectively.

A register 752 provides the load controls for the PN vectors generated for the fingers and searchers, fn0_pn_ld through fn11_pn_ld and sr0_pn_ld through These load signals are used to indicate that the PN vectors are ready for the selected request, and may be used by the fingers and searchers to load the PN vectors generated for these units.

Figure 8:
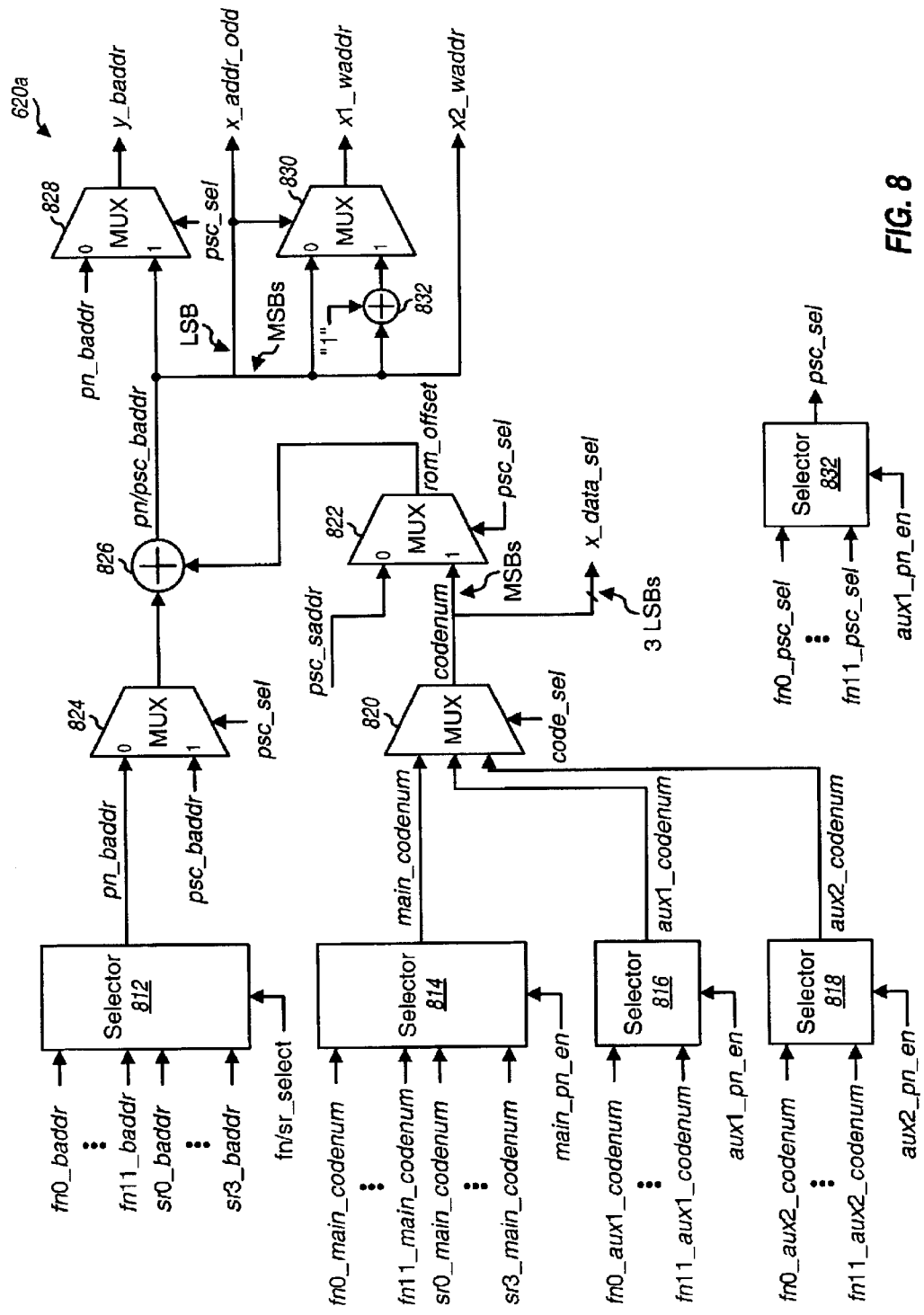

FIG. 8 is a block diagram of an embodiment of an address and control signal generator 620*a*, which is one embodiment of address and control signal generator 620 in FIG. 6. Generator 620*a* receives the phases for the PN vectors to be provided for the fingers and searchers, the code numbers for the main and auxiliary scrambling codes, and the controls indicative of whether or not the PSC is to be provided by the PN generator. Generator 620*a* then provides the addresses for the X_ROM and Y_ROM for each selected request.

Within generator 620*a*, the PN vector phases for all fingers and searchers, fn0_baddr through fn11_baddr and sr0_baddr through sr3_baddr, are provided to a selector 812, which also receives the fn/sr_select control. Selector 812 then provides the PN vector phase for the selected request, which is denoted as pn_baddr.

The main scrambling code numbers for all fingers and searchers, fn0_main_codenum through fn11_main_codenum and sr0_main_codenum through sr3_main_codenum, are provided to a selector 814, which also receives the main_pn_en control. Selector 814 then provides the main scrambling code number for the selected request, which is denoted as main_codenum. The first auxiliary scrambling code numbers for all fingers, fn0_aux1_codenum through fn11_aux1_codenum, are provided to a selector 816, which also receives the aux1_pn_en control. Selector 816 then provides the first auxiliary scrambling code number for the selected request, if any, which is denoted as aux1_codenum. Similarly, the second auxiliary scrambling code numbers for all fingers, fn0_aux2_codenum through fn11_aux2_codenum, are provided to a selector 818, which also receives the aux2_pn_en control. Selector 818 then provides the second auxiliary scrambling code number for the selected request, if any, which is denoted as aux2_codenum.

A multiplexer 820 receives the three code numbers main_codenum, aux1_codenum, and aux2_codenum from selectors 814, 816, and 818, respectively, selects one of the three code numbers based on a code_sel control, and provides the selected code number, which is denoted as codenum. The code_sel control may be obtained by concatenating the aux2_pn_ld and aux1_pn_ld (i.e., codesel=aux2_pn_ld & aux1_pn_ld). A multiplexer 822 receives the most significant bits (MSBs) of codenum from multiplexer 820 (i.e., all but three LSBs of codenum) and the start address, psc_saddr, of the PSC in the Y_ROM. Multiplexer 822 then selects one of the inputs based on the psc_sel control and provides the selected input as rom_offset. The rom_offset is indicative of either (1) the byte address offset for the X_ROM, which is determined by the scrambling code number, or (2) the byte address offset for the PSC in the Y_ROM.

A multiplexer 824 receives the pn_baddr from multiplexer 812 and the byte address of the PSC, psc_baddr, selects one of the inputs based on the psc_sel control, and provides the selected input to an adder 826. Adder 826 also receives and adds rom_offset to the output from multiplexer 824 and provides pn/psc_baddr. The pn/psc_baddr is indicative of either (1) the byte address for the X_ROM, if a PN vector is to be provided by the PN generator, or (2) the byte address for the Y_ROM, if the PSC is to be provided.

For the specific ROM implementation shown in FIG. 5, an entire word is retrieved from each of the X1_ROM and X2_ROM for each PN vector, with the specific word being dependent on whether the I(i) vector needed for the PN vector is stored starting in the X1_ROM or X2_ROM. The LSB of the pn/psc_baddr is provided as an x_addr_odd control, and all remaining bits of pn/psc_baddr are provided as the word address, x2_waddr, for the X2_ROM, as shown in equations (5) and (10). This word address is also provided to one input of a multiplexer 830 and to an adder 832. Adder 832 adds a value of one ("1") to the word address and provides the result to the second input of multiplexer 830. If the x_addr_odd control indicates that the byte address for the X_ROM is odd, then the value from adder 832 is provided as the word address, x1_waddr, for the X1_ROM, as shown in equation (10). Otherwise, if the byte address for the X_ROM is even, then the x2_waddr is provided as the word address for the X1_ROM, as shown in equation (5).

A multiplexer 828 receives the pn_baddr from selector 812 and the pn/psc_baddr from adder 826. The multiplexer then provides either (1) pn_baddr as the byte address, y_baddr, for the Y_ROM if a PN vector is to be provided by the PN generator, or (2) pn/psc_baddr as the byte address for the Y_ROM if a PSC vector is to be provided, as indicated by the psc_sel control.

Bank of ROMs 630 in PN generator 610 may be implemented as shown in FIG. 5, which includes the X1_ROM, X2_ROM, and Y_ROM. For each PN vector to be provided by PN generator 610, address generator 620*a* provides the word addresses x1_waddr and x2_waddr for the X1_ROM and X2_ROM, respectively, and the byte address y_baddr for the Y_ROM. The necessary chip select and read enable signals are also provided for these ROMs, but are not described herein for simplicity. The X1_ROM, X2_ROM, and Y_ROM then provide three words, x1_data, x2_data, and y_data, respectively, for each read cycle.

Figure 9:
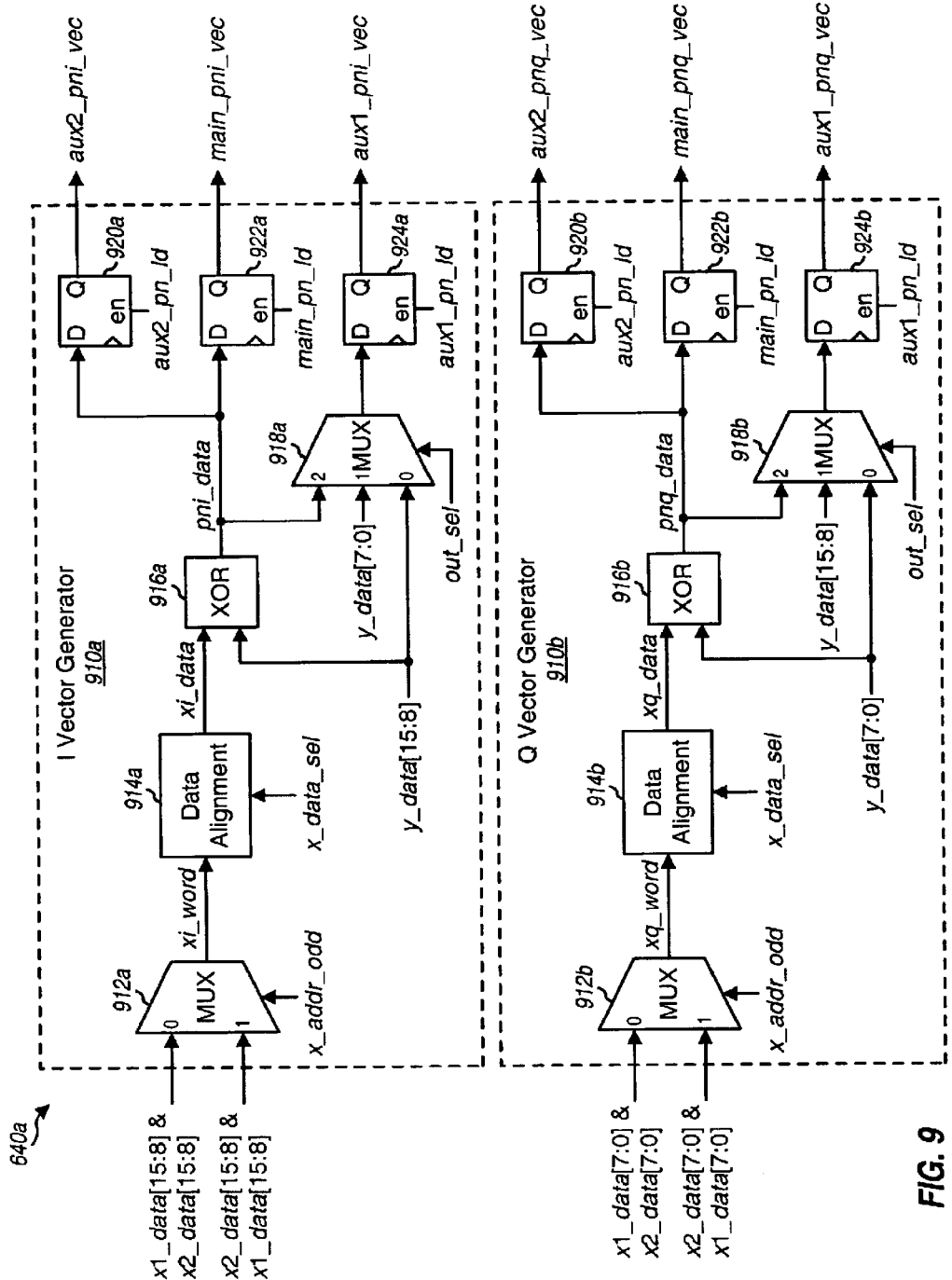

FIG. 9 is a block diagram of an embodiment of a bit alignment and buffering unit 640*a*, which is one embodiment of bit alignment and buffering unit 640 in FIG. 6. For each PN vector to be provided by PN generator 610, unit 640*a* receives three words x1_data, x2_data, and y_data from ROMs 630, shifts the x1_data and x2_data by the proper number of bit positions to obtain the desired scrambling code, performns an XOR between the bytes of the y_data with the corresponding bytes of the x1_data or x2_data, and provides the PN vectors. Each PN vector is a complex vector comprised of an inphase vector, pni_vec, and a quadrature vector, pnq_vec, which are generated by I and Q vector generators 910*a* and 910*b*, respectively.

Within I vector generator 910a, a multiplexer 912a receives (x1_data[15:8] & x2_data[15:8]) on one input and (x2_data[15:8] & x1_data[15:8]) on the other input. Multiplexer 912a then provides (x1_data[15:8] & x2_data[15:8]) if the byte address for the X_ROM is even, as shown in equation (7), and (x2_data[15:8] & x1_data[15:8]) if the byte address is odd, as shown in equation (11). The output of multiplexer 912a, xi_word, is one contiguous word regardless of the starting address of the desired X(i) vector in the X_ROM.

A data alignment unit 914a receives and shifts the xi_word from multiplexer 912a by the number of bit positions indicated by the x_data_sel, as shown in equation (9). In an embodiment, data alignment unit 914a is implemented with combinatory logic (instead of a shift register) to provide minimum and constant delay through the data alignment unit.

Unit 914a then provides a data byte, xi_data, corresponding to the desired scrambling code number and PN phase. The xi_data is then XORed with the upper byte of y_data by an XOR gate 916a to provide pni_data. The xi_data corresponds to X(i+n) in FIG. 4, the y_data[15:8] corresponds to Y(i), the pni_data corresponds to I(i), and XOR gate 916a corresponds to modulo-2 adder 418. A register 920a receives and latches the pni_data to provide aux2_pni_vec, if this I vector is for the second auxiliary scrambling code, as determined by the aux2_pn_ld signal. Similarly, a register 922a receives and latches the pni_data to provide main_pni_vec, if this I vector is for the main scrambling code, as determined by the main_pn_ld signal.

A multiplexer 918a receives y_data[15:8], y_data[7:0], and pni_data on three inputs. Multiplexer 918a then provides one of the inputs based on an out_sel control, which may be generated by a concatenation of an inverted psc_sel and the LSB of pn_baddr (i.e., out_sel='not psc_sel' & pn_baddr[0]). In particular, multiplexer 918a provides pni_data if a PN vector is being provided for the first auxiliary scrambling code, y_data[7:0] if the first byte of the PSC word is being provided for a PSC vector, and y_data[15:8] if the second byte of the PSC word is being provided. A register 924a receives and latches the output from multiplexer 918a to provide aux1_pni_vec, if this I vector is for the first auxiliary scrambling code or the PSC, as determined by the aux1_pn_ld signal.

Unit 910b is designed similar to unit 910a, but receives different inputs, as shown in FIG. 9. Unit 910b provides main_pnq_vec, aux1_pnq_vec, and aux2_pnq_vec for the main, first auxiliary, and second auxiliary scrambling codes, respectively.

In the specific implementation shown in FIG. 6, ROM-based PN generator 330a receives a number of parameters from the fingers and searchers and provides a set of one or more PN vectors for each finger and searcher. In an embodiment, to reduce the number of interface signals between the fingers/searchers and the PN generator, a two-level arbitration scheme is implemented whereby the rake receiver performs the first level of arbitration and the PN generator performs the second level of arbitration. This design can greatly reduce the number of interface signals between the rake receiver and PN generator.

Figure 10:
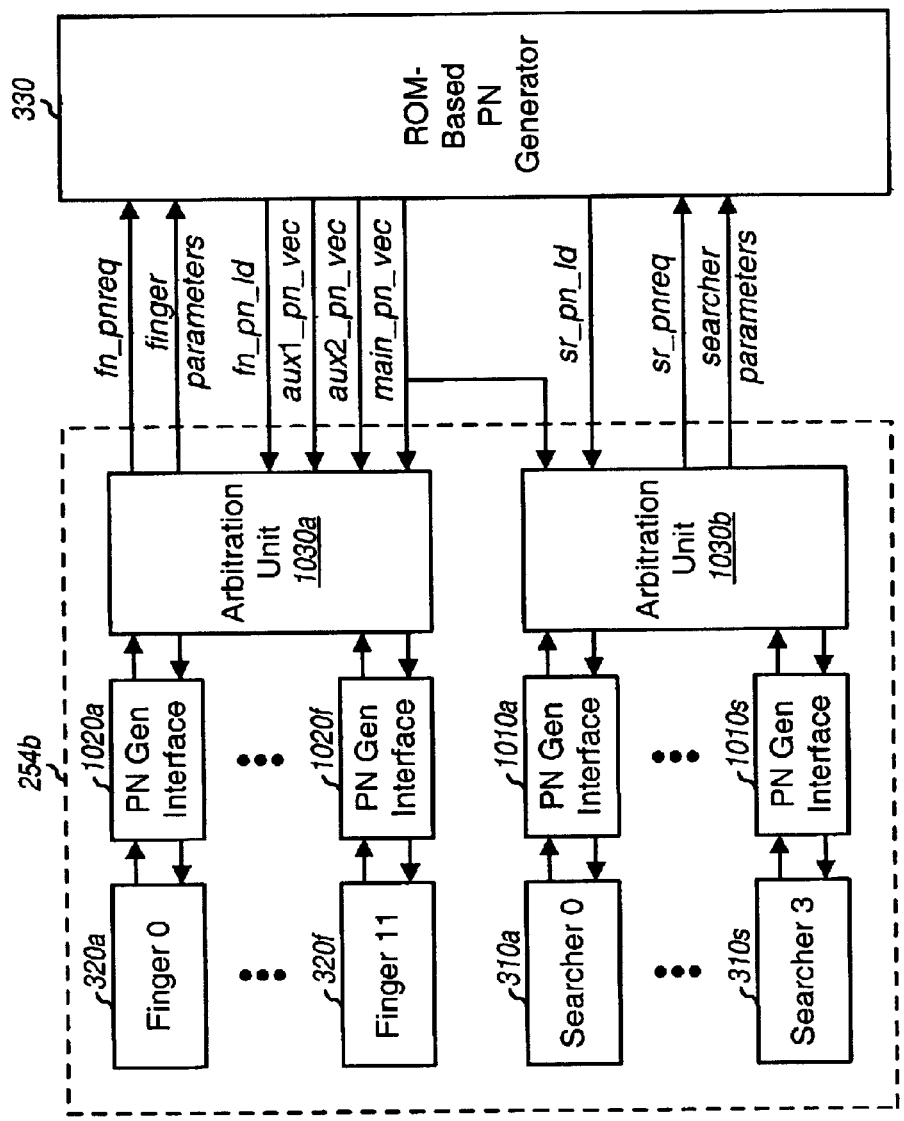
FIG. 10 is a block diagram of an embodiment of a two-level arbitration scheme for ROM-based PN generation.

FIG. 10 is a block diagram of an embodiment of a two-level arbitration scheme for ROM-based PN generation. In this embodiment, a rake receiver 254b includes 12 fingers 320 and 4 searchers 310. Each searcher 310 is associated with a corresponding PN generator interface unit 1010, and each finger 320 is associated with a corresponding PN generator interface unit 1020.

Each PN generator interface unit locally maintains a PN count value for the associated finger/searcher. This PN count value is indicative of the phase of the PN vector to be used for descrambling. The PN count value may be maintained in chipx8 resolution, in which case it may correspond to pn_cnt_x8 shown in equation (1).

For each finger, the PN count value may be derived based on the system reference count value, ref_cnt, which is provided by the system timer and used as the reference timing by the entire receiver unit. The PN count value for each active finger may also be advanced or retarded (e.g., by ⅛ PN chip resolution) based on changes in the arrival time of the multipath component being processed by that finger, as determined by a timing control loop maintained by that finger.

For each searcher, the PN count value may be derived based on a local reference count value provided by a local counter. This allows each searcher to evaluate different hypotheses in the search for strong multipath components. The PN count value may be temporarily halted between hypotheses (e.g., to update different parameters, evaluate search results, and so on).

The PN count value is reset to zero (or wraps around) at the end of the scrambling sequence, which is 38,400 chips for W-CDMA. Each PN generator interface unit may further include circuitry needed to slew the PN count value to a particular target value, if needed. The generation of the PN count value, the adjustment of this value to track the timing of the multipath component, and the slewing of the PN count value are all known in the art and not described herein.

Each PN generator interface unit 1020 provides the PN request and the set of parameters for the associated finger/searcher. PN generator interface unit 1020 for each active finger and searcher may provide the respective set of parameters enumerated above. As the PN request for a particular finger/searcher is processed by ROM-based PN generator 330, the available PN vector(s) are received and latched by the associated PN generator interface unit 1020, as indicated by the main_pn_en[x], aux1_pn_en[x], aux2_pn_en[x] signals. The PN vector(s) are then forwarded from the PN generator interface unit to the finger/searcher.

An arbitration unit 1030a receives the PN requests and parameters from PN generator interface units 1020 for all fingers, selects one request for processing at any given moment, and provides the PN request and parameters for the selected finger to ROM-based PN generator 330. Similarly, an arbitration unit 1030b receives the PN requests and parameters from PN generator interface units 1010 for all searchers, selects one request for processing at any given moment, and provides the PN request and parameters for the selected searcher to ROM-based PN generator 330. PN generator 330 then arbitrates and processes the requests from arbitration units 1030a and 1030b.

In another embodiment, the arbitration for all fingers and searchers is performed by an arbitration unit in the rake receiver. This arbitration unit would then provide the request and parameters for the selected finger/searcher. This embodiment can further reduce the number of interface signals between the rake receiver and PN generator.

The ROM-based PN generator described herein can support multiple fingers and searchers simultaneously. As the number of the fingers and searchers grows, the ROM-based PN generator design can provide greater savings in die area and power in comparison to a design with one dedicated PN generator per finger/searcher. The ROM-based PN generator can also support both real-time and non-real-time receiver architectures, and can further support numerous finger and searcher architectures. The ROM-based PN generator can also provide PN vector at any desired PN phase, thus eliminating the need for time-consuming slewing operations, which are common performed by conventional PN generators. With the ROM-based PN generator, the fingers and searchers can simply calculate the PN phase (or ROM addresses) of the desired PN sequence, and the ROM-based PN generator can directly generate PN vector at this PN phase without the need for slewing operations.

The ROM-based PN generator described herein may be used to provide PN vectors for various processing units (e.g., demodulation fingers and searchers). For some rake receiver designs, the multiple fingers are implemented by a single digital signal processor (DSP) that is operated in a time multiplexed manner. The same DSP or a different DSP may be used to implement the searchers. For a design in which the fingers and/or searchers are implemented in TDM manner, the ROM-based PN generator may be operated in the same TDM manner. In this way, the interface between the PN generator and the DSP(s) for the fingers and searchers may be simplified.

The ROM-based PN generation techniques described herein may be used in various wireless communication systems. For example, these techniques may be use in CDMA, TDMA, FDMA, and other wireless communication systems. These systems may implement one or more applicable standards. For example, the CDMA systems may implement IS-95, IS-2000, IS-856, W-CDMA, and so on. The TDMA systems may implement GSM and so on. These various standards are known in the art.

For clarity, a specific implementation is described herein whereby the PN sequences are stored in a bank of ROMs. In general, the PN sequences may be stored in one or more memory units that may be implemented with various memory technologies. For example, each memory unit may be implemented as a ROM, programmable ROM (PROM), electrically programmable ROM (EEPROM), random access memory (RAM), static RAM (SRAM), dynamic RAM (DRAM), Flash, or some other memory type. Each PN sequence may be stored in a separate set of one or more memory units, as described above. Alternatively, all PN sequences may be stored in a single larger memory unit or in multiple memory units.

The ROM-based PN generation techniques described herein may be implemented by various means. For example, the elements used for PN generation may be implemented in hardware, software, or a combination thereof. For a hardware implementation, various elements used for PN generation may be implemented within one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, other electronic units designed to perform the functions described herein, or a combination thereof. The memory unit(s) used to store the PN sequences may be implemented within or external to the processing unit(s) that implement the remaining portion of the PN generator.

For a software implementation, various portions of the PN generation may be implemented with modules (e.g., procedures, functions, and so on) that perform the functions described herein. For example, some or all of the functions performed by units 610, 620, and 640 in FIG. 6 may be implemented with software modules. The software codes may be stored in a memory unit (e.g., memory 262 in FIGS. 2 and 3) and executed by a processor (e.g., controller 260). This memory unit may be implemented within the processor or external to the processor, in which case it can be communicatively coupled to the processor via various means as is known in the art.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A device operable to provide pseudo-random number (PN) vectors, comprising:
    a request arbitration unit operative to receive a plurality of requests for PN vectors from a plurality of processing units and provide a control indicative of each request selected for processing;
    an address generator operative to provide a set of one or more addresses for each selected request; and
    a buffering unit operative to receive one or more segments of one or more PN sequences stored in a memory at the, one or more addresses, derive a set of one or more PN vectors from the one or more PN segments, and provide the set of one or more PN vectors for each selected request,
    wherein the plurality of requests are from a plurality of demodulation fingers and searchers of a rake receiver.

2. The device of claim 1, further comprising:
    one or more memory units implementing the memory and operative to provide the one or more PN segments for each selected request based on the set of one or more addresses.

3. The device of claim 1, wherein the plurality of requests are processed in a time multiplexed manner and one request is processed at a time.

4. The device of claim 1, wherein the plurality of requests are processed in an order determined based on a particular priority assignment scheme.

5. The device of claim 2, wherein each memory unit is implemented as a read-only memory (ROM).

6. The device of claim 2, wherein the or more memory units are configured to store all bit values for all PN sequences needed to derive all requestable PN vectors.

7. The device of claim 6, wherein each PN sequence is stored in a respective set of at least one memory unit.

8. The device of claim 1, wherein each address provided by the address generator is derived based on a code number and a PN phase associated with the selected request.

9. The device of claim 8, wherein the PN phase is provided in a discrete time unit corresponding to a time period covered by one PN vector.

10. The device of claim 1, wherein the buffering unit is further operative to shift each PN segment by a particular number of bit positions determined by a code number associated with the selected request.

11. The device of claim 10, wherein the buffering unit includes combinatory logic configured to shift each PN segment by the particular number of bit positions.

12. The device of claim 1, wherein each of the one or more PN vectors in the set provided for the selected request is associated with a different code number.

13. The device of claim 1, wherein each PN vector covers an 8-chip period.

14. A device operable to provide pseudo-random number (PN) vectors, comprising:
a request arbitration unit operative to receive a plurality of requests for PN vectors from a plurality of processing units and provide a control indicative of each request selected for processing;
address generator operative to provide a set of one or more addresses for each selected request; and
a buffering unit operative to receive one or more segments of one or more PN sequences stored in a memory at the one or more addresses, derive a set of one or more PN vectors from the one or more PN segments, and provide the set of one or more PN vectors for each selected request,
wherein the one or more PN sequences are used to spectrally spread data in a W-CDMA communication system and the memory stores an X(i) sequence and a Y(i) sequence defined by W-CDMA for scrambling codes.

15. The device of claim 14, wherein the plurality of requests are from a plurality of demodulation fingers and searchers of a rake receiver.

16. The device of claim 15, wherein a set of up to three PN vectors is provided for each selected request from a demodulation finger and one PN vector is provided for each selected request from a searcher.

17. The device of claim 15, wherein a set of up to three PN vectors for up to three different scrambling codes is provided for each selected request from a demodulation finger.

18. The device of claim 17, wherein the up to three different scrambling codes for each selected request from a demodulation finger include a main scrambling code, a first auxiliary scrambling code, and a second auxiliary scrambling code.

19. The device of claim 15, and operable to provide a primary synchronization code (PSC) vector for a selected request from a demodulation finger.

20. The device of claim 1, wherein each request is associated with a respective set of parameters indicative of a specific set of one or more PN vectors to be provided for the request.

21. The device of claim 20, wherein a plurality of sets of parameters associated with the plurality of requests are sent via a common set of signals.

22. The device of claim 21, wherein arbitration to determine a particular request and associated set of parameters to be sent on the common set of signals is performed by units requesting the PN vectors.

23. An apparatus operable to provide pseudo-random number (PN) vectors, comprising:
means for receiving a plurality of requests for PN vectors from a plurality of processing units;
means for providing a control indicative of each request selected for processing;
means for deriving a set of one or more addresses for each selected request;
means for receiving one or more segments of one or more PN sequences stored in one or more memory units, wherein the one or more PN segments are obtained based on the set of one or more addresses; and
means for providing a set of one or more PN vectors derived from the one or more PN segments for each selected request,
wherein the plurality of requests are from a plurality of demodulation fingers and searchers of a rake receiver.

24. The apparatus of claim 23, further comprising:
means for shifting each PN segment by a particular number of bit positions determined by a code number associated with the selected request.

25. The apparatus of claim 23, wherein the one or more memory units are configured to store all bit values for all PN sequences needed to derive all requestable PN vectors.

26. A rake receiver in a wireless communication system, comprising:
a plurality of searchers each configurable to process a received signal to search for multipath components;
a plurality of demodulation fingers each configurable to process a respective multipath component in the received signal; and
a pseudo-random number (PN) generator operative to receive a plurality of requests for PN vectors from the demodulation fingers and searchers, provide a control indicative of each request selected for processing, derive a set of one or more addresses for each selected request, receive one or more segments of one or more PN sequences stored in one or more memory units at the one or more addresses, derive a set of or more PN vectors from the one or more PN segments, and provide the set of one or more PN vectors for each selected request.

27. The rake receiver of claim 26, wherein the one or more memory units store an X(i) sequence and a Y(i) sequence defined by W-CDMA for scrambling codes.

28. The rake receiver of claim 26, wherein the PN generator is operative to provide a set of up to three PN vectors for each selected request from a demodulation finger and one PN vector for each selected request from a searcher.

29. A terminal in a wireless communication system comprising:
a front-end unit operative to process a received signal to provide samples; and
rake receiver operative to process the samples to provide demodulated data, the rake receiver including
a plurality of searchers each configurable to process the samples to search for multipath components in the received signal;
a plurality of demodulation fingers each configurable to process the samples to demodulate a respective multipath component in the received signal; and
a pseudo-random number (PN) generator operative to receive a plurality of requests for PN vectors from the demodulation fingers and searchers, provide a control indicative of each request selected for processing, derive a set of one or more addresses for each selected request, receive one or more segments of one or more PN sequences stored in one or more memory units at the one or more addresses, derive a set of one or more PN vectors from the one or more PN segments, and provide the set of one or more PN vectors for each selected request.

30. The terminal of claim 29, wherein the one or more memory units store an X(i) sequence and a Y(i) sequence defined by W-CDMA for scrambling codes.

31. The terminal of claim 29, wherein the PN generator is operative to provide a set of up to three PN vectors for each selected request from a demodulation finger and one PN vector for each selected request from a searcher.

32. A memory communicatively coupled to a digital signal processing device (DSPD) capable of interpreting digital information to:
receive a plurality of requests for pseudo-random number (PN) vectors from a plurality of processing units;

provide a control indicative of each request selected for processing;

derive a set of one or more addresses for each selected request;

receive one or more segments of one or more PN sequences stored in one or more memory units, wherein the one or more PN segments are obtained based on the set of one or more addresses; and provide a set of one or more PN vectors derived from the one or more PN segments for each selected request, wherein the plurality of requests are from a plurality of demodulation fingers and searchers of a rake receiver.

33. A program storage device readable by a machine, tangibly embodying a program of instructions executable by the machine to perform a method for, providing pseudo-random number (PN) vectors for a plurality of processing units said method comprising:

receiving a plurality of requests for PN vectors from the plurality of processing units;

providing a control indicative of each request selected for processing;

deriving a set of one or more addresses for each selected request;

receiving one or more segments of one or more PN sequences stored in one or more memory units, wherein the one or more PN segments are obtained based on the set of one or more addresses; and providing a set of one or more PN vectors derived from the one or more PN segments for each selected request, wherein the plurality of requests are from a plurality of demodulation fingers and searchers of a rake receiver.

\* \* \* \* \*